S. G. MARTIN.
PROCESS OF EXTRACTING IRON FROM ITS ORES.
APPLICATION FILED JAN. 14, 1909.
975,625. Patented Nov. 15, 1910.
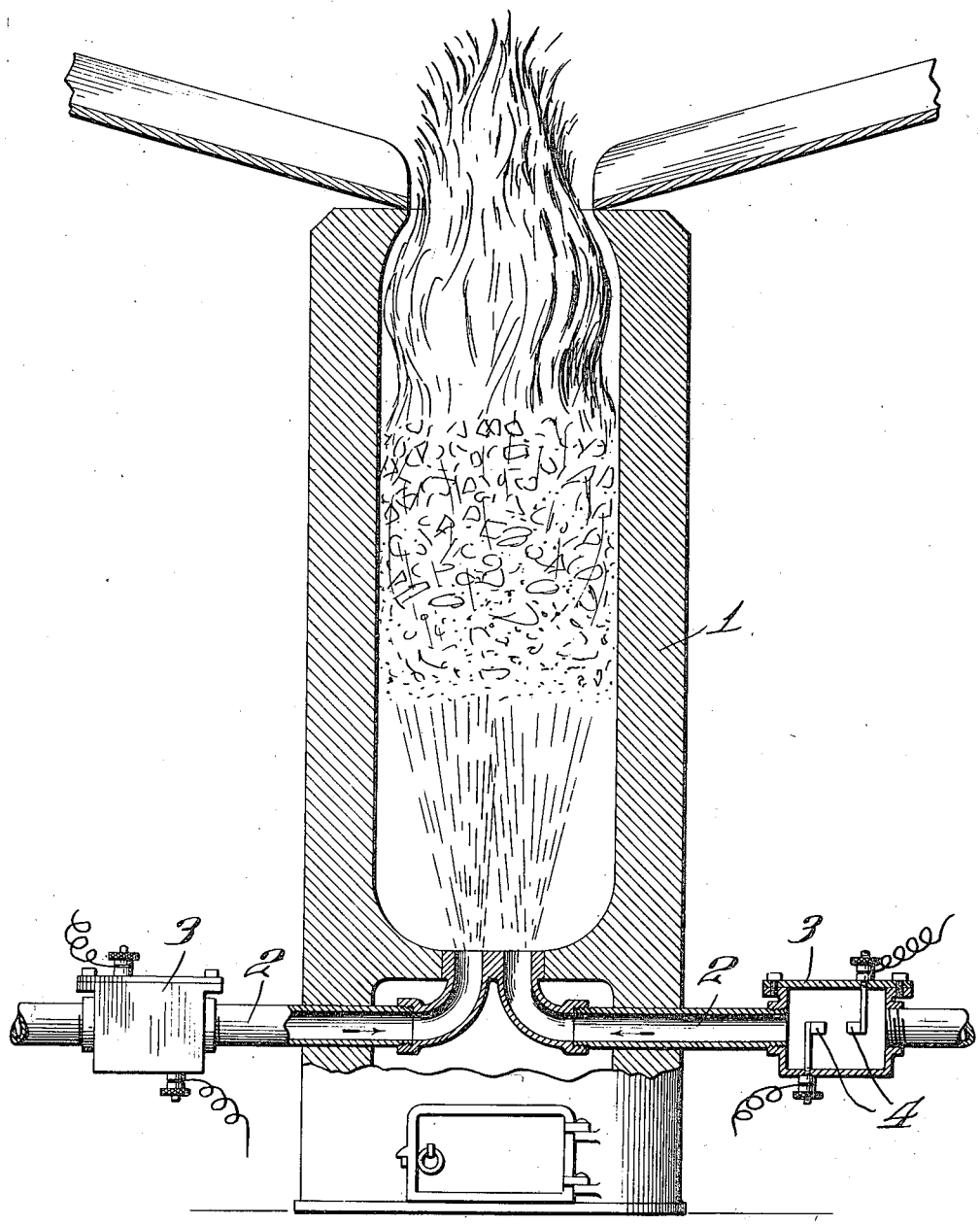
Attest.
H. G. Fletcher.
M. P. Smith
Inventor,
Stephen G. Martin.
By Higdon Longan
attys.

UNITED STATES PATENT OFFICE.

STEPHEN G. MARTIN, OF CHICAGO, ILLINOIS, ASSIGNOR OF ONE-THIRD TO WILLIAM O. BARTHOLOMEW, OF ST. LOUIS, MISSOURI, AND ONE-THIRD TO EDWARD SCHAAF, OF ST. MARYS, MISSOURI.

PROCESS OF EXTRACTING IRON FROM ITS ORES.

975,625.  Specification of Letters Patent.  Patented Nov. 15, 1910.

Application filed January 14, 1909. Serial No. 472,167.

*To all whom it may concern:*

Be it known that I, STEPHEN G. MARTIN, a citizen of the United States, and resident of Chicago, Illinois, have invented certain new and useful Improvements in Processes of Extracting Iron from Its Ores, of which the following is a specification containing a full, clear, and exact description, reference being had to the accompanying drawings, forming a part hereof.

My invention relates to a process of extracting iron from its ores and its subsequent conversion into steel, and said process being applicable to the so-called non-Bessemer as well as to Bessemer ores, and by my improved process either one of said ores can be readily converted into iron of such quality as to be immediately available for the Bessemer blow.

The desirable qualities in iron applicable for the manufacture of steel are those of a metal free, or practically free, from sulfur, silicon, phosphorus and the like, and it is well known that such metalloids remain in undesirable quantities in iron produced by ordinary processes in blast furnaces.

My invention consists in dispensing with the use of atmospheric air in the blast furnace and substituting therefor modified or ionized air made by passing atmospheric air through the flame of an electric discharge, and this modified or ionized air passes into the blast furnace in an absolutely dry state, and in such condition attacks the furnace charge with a high degree of chemical energy, which reduces the charge in much less time than is now required by methods in general use while the resultant metal is found to be homogeneous iron practically free from all metalloid impurities and of the quality and conditions most desirable in iron which is to be converted into steel by the Bessemer process.

It has been demonstrated that when ordinary atmospheric air is passed through the flame of an electric discharge or through a flaming arc of electricity, a gaseous medium is produced consisting of pure air and gaseous peroxid of nitrogen, and this is the sense
in which applicant uses the expression "modified or ionized air", the gaseous peroxid of nitrogen being the active agent in the process. This gas is conducted into the furnace as rapidly as it is formed. Under these conditions dissociation of the gas (the temperature of the furnace being taken into consideration) does not take place during its passage from its source of supply to the furnace. It is, therefore, not necessary that means be provided to insure stability of the gas.

In the drawing I have shown an ordinary blast furnace equipped for the carrying out of my improved process, and referring by numerals to said drawing, 1 designates the body of the furnace, into the lower end of which leads one or more pipes 2, and located in these pipes are housings 3, in each of which is located a pair of electrodes 4, properly connected to an electric generator and adapted to produce a flaming electric discharge. The portions of the pipes 2, leading to these housings 3, are preferably connected to blast fans, or like means of forcing atmospheric air into the housings 3.

In carrying out my improved process, the iron ore, fluxing material and fuel are placed in the furnace in the usual manner and after said furnace is fired atmospheric air is forced into and through the housings 3, and as said air passes through the flaming electric discharge between the electrodes 4, said air becomes modified or ionized, and in such condition is forced into the furnace and passed upward through the charge therein.

The principal impurities which I desire to remove are the sulfur and phosphorus. These impurities are removed partially by way of the slag or furnace cinders and the stack. The slag and the metal are removed in the ordinary way, through tap holes.

The reactions through which the sulfur impurities are removed are probably as follows:

$$S+O_2=SO_2.$$
$$SO_2+H_2O=H_2SO_3.$$
$$SO_2+H_2O+NO_2=H_2SO_4+NO.$$

With reference to the phosphorous impurities, the reactions occurring are probably as follows:

$$P+2NO_2=N_2P+4O.$$
$$P+2NO_2+SO_2+H_2O=N_2P+H_2SO_4+3O.$$

In this reaction, it is understood that moisture ($H_2O$) is present in the upper levels of the furnace.

The probable reactions which occur in the reduction of the metal from the ore, from the beginning of the operation to the formation of the spongy iron, are as follows:

$$3Fe_2O_3+CO=2Fe_3O_4+CO_2.$$
$$Fe_3O_4+CO=3FeO+CO_2.$$
$$FeO+CO=Fe+CO_2.$$
$$2Fe_2O_3+2CO+NO_2=$$
$$2FeO+Fe_2O_3+CO_2+NO_3+C.$$
$$2Fe_2O_3+8CO=7CO_2+4Fe+C.$$
$$3Fe_2O_3+2CO_2+NO_2=2Fe_3O_4+2CO+NO_5.$$
$$Fe_2O_3+3C=2Fe+3CO.$$
$$Fe_3O_4+4C=3Fe+4CO.$$
$$FeO+C=Fe+CO.$$
$$CaCO_3+C=CaO+CO_2+C.$$
$$CaO+3C=CaC_2+CO.$$
$$CaC_2+3NO_2=Ca(NO_2)_2+2C+N.$$

In the present methods, the atmosphere within the furnace, that is to say, in the space above the twyers to the point where the temperature is about 800° C., consists almost entirely of nitrogen and carbonic oxid, and one of the objects of my process is secured by adding to the components of said atmosphere gaseous peroxid of nitrogen, thus changing the atmosphere to an atmosphere consisting of carbonic oxid, nitrogen peroxid and nitrogen, and it is apparent that a sensible reduction of the volume of nitrogen conducted into the furnace must furnish a proportionately less amount of this inert gas to absorb and carry out of the furnace (with the exception of the relatively small amount restored to the upper levels) the heat so badly needed in the operation of reducing the furnace charge, especially in the zone of fusion.

Without assuming to accurately equate all the conditions which are brought about during the operation of reducing iron ore in an atmosphere of nitrogen peroxid, carbonic oxid, carbon dioxid, nitrogen, and the gases usually reckoned as nitrogen, it is believed that the reactions heretofore set forth probably occur.

I have demonstrated in practice that this modified or ionized air very rapidly reduces the charge within the furnace and the resultant product is homogeneous and with but a very small per cent. of metalloid impurities.

In ordinary blast furnace pig-iron a portion of the impurities is derived from the fluxing material and fuel employed in the reducing operation, but where modified or ionized air is employed in reducing the charge these impurities are almost entirely eliminated, which result is not attained where atmospheric air is employed in the blast.

I do not desire to limit or confine myself to the use of modified or ionized air produced by passing atmospheric air through the flame of electric discharge, but under certain conditions satisfactory results may be obtained by utilizing a mixture consisting of atmospheric air and the gaseous products resulting from the action of nitric acid or its compounds upon ferrous sulfate, or it may be found desirable to enrich the modified or ionized air with the nitrogenous oxids produced by the chemical action above stated.

According to the modern blast furnace practice, the blast consists of about 23 parts oxygen and 77 parts nitrogen. This nitrogen gas is practically stable and inert chemically, and performs no function other than to "rob" the smelting zone of a large portion of its heat. Now while it is true that a small portion of this heat is restored to the furnace in its higher levels during the upward passage of the nitrogen, the greater portion of it is carried out at the top of the furnace, and consequently is a total loss to the furnace. The special object of my process is to change this inert and deterring character of the nitrogen content of the blast and render it of specific value and use in the process of ore smelting. This is accomplished by injecting into the blast the gaseous medium heretofore described, namely, peroxid of nitrogen, a gas known to possess in a great degree the property of supporting combustion. In other words, the unstable and inert nitrogen of the atmosphere is converted into nitrogen peroxid before it is sent in as a part of the blast.

I claim:

1. The herein described process of smelting, which consists in converting a portion of the nitrogen of the air into nitrogen peroxid gas and reducing the ore by heat in the presence of said nitrogen peroxid gas.

2. The herein described process of smelting ores, which comprises the step of passing into the furnace containing the ores a gaseous medium containing peroxid of nitrogen.

3. The herein described process of smelting ores in blast furnaces, which consists in subjecting the ore while in process of decomposition by heat, to the action of a blast containing peroxid of nitrogen.

4. A step in processes of smelting ores in blast furnaces, which step consists in heating the ore and subjecting the ore while hot to the action of a gaseous medium, consisting of pure air and nitrogen peroxid.

5. The herein described process of smelting ores which consists in subjecting a mixture of fluxed ores to the action of heat and a gaseous medium consisting of pure air and nitrogen peroxid.

6. The herein described process of smelting ores, which consists in subjecting the ore while it is being decomposed by heat to a gaseous medium containing peroxid of nitrogen.

In testimony whereof, I have signed my name to this specification, in presence of two subscribing witnesses.

STEPHEN G. MARTIN.

Witnesses:
M. P. SMITH,
E. L. WALLACE.